United States Patent
DiFalco

(10) Patent No.: US 8,914,341 B2
(45) Date of Patent: Dec. 16, 2014

(54) METHOD AND APPARATUS FOR CONTINUOUS COMPLIANCE ASSESSMENT

(75) Inventor: Robert A. DiFalco, Portland, OR (US)

(73) Assignee: Tripwire, Inc., Portland, OR (US)

( * ) Notice: Subject to any disclaimer, the term of this patent is extended or adjusted under 35 U.S.C. 154(b) by 688 days.

(21) Appl. No.: 12/167,934

(22) Filed: Jul. 3, 2008

(65) Prior Publication Data
US 2010/0005107 A1    Jan. 7, 2010

(51) Int. Cl.
*G06F 17/30* (2006.01)
*H04L 12/26* (2006.01)

(52) U.S. Cl.
CPC ............ *H04L 12/2697* (2013.01); *H04L 43/50* (2013.01)
USPC .......................................... 707/694; 707/758

(58) Field of Classification Search
None
See application file for complete search history.

(56) References Cited

U.S. PATENT DOCUMENTS

| | | |
|---|---|---|
| 5,063,523 A | 11/1991 | Vrenjak |
| 5,542,047 A | 7/1996 | Armstrong |
| 5,655,081 A | 8/1997 | Bonnell et al. |
| 5,745,669 A | 4/1998 | Hugard et al. |
| 5,764,913 A | 6/1998 | Jancke et al. |
| 5,778,184 A | 7/1998 | Brownmiller et al. |
| 5,845,062 A | 12/1998 | Branton et al. |
| 5,878,408 A | 3/1999 | Van Huben et al. |
| 5,913,036 A | 6/1999 | Brownmiller et al. |
| 5,913,037 A | 6/1999 | Spofford et al. |
| 5,933,838 A | 8/1999 | Lomet |
| 5,963,959 A | 10/1999 | Sun et al. |
| 6,041,347 A | 3/2000 | Harsham et al. |
| 6,052,722 A | 4/2000 | Taghadoss |
| 6,064,656 A | 5/2000 | Angal et al. |
| 6,072,777 A | 6/2000 | Bencheck et al. |
| 6,122,639 A | 9/2000 | Babu et al. |
| 6,122,664 A | 9/2000 | Boukobza et al. |
| 6,125,390 A | 9/2000 | Touboul |
| 6,144,993 A | 11/2000 | Fukunaga et al. |
| 6,195,689 B1 | 2/2001 | Bahlmann |
| 6,222,827 B1 | 4/2001 | Grant et al. |
| 6,253,339 B1 | 6/2001 | Tse et al. |
| 6,272,537 B1 | 8/2001 | Kekic et al. |
| 6,341,287 B1 | 1/2002 | Sziklai et al. |
| 6,356,885 B2 | 3/2002 | Ross et al. |
| 6,393,386 B1 | 5/2002 | Zager et al. |
| 6,393,474 B1 | 5/2002 | Eichert et al. |

(Continued)

OTHER PUBLICATIONS

Parnas, "On the Criteria to Be Used in Decomposing Systems into Modules," *Communications of the ACM*, vol. 15, No. 12, pp. 1053-1058 (Dec. 1972).

(Continued)

*Primary Examiner* — Son T Hoang
(74) *Attorney, Agent, or Firm* — Klarquist Sparkman, LLP

(57) ABSTRACT

In various embodiments, a target host may provide a change data to a compliance server in response to detecting a change, and the change data may include one or more rules, settings, and/or parameters. Also, in various embodiments, the compliance server may determine whether the one or more rules, settings, and/or parameters meet one or more compliance policies and generate one or more test results based at least on the results of the determining. Further, in some embodiments, the target host may detect a change to a rule, setting, and/or parameter based on a collection policy defining what change data is to be collected by the target host and provide data associated with the rule, setting, and/or parameter as change data to the compliance server.

16 Claims, 4 Drawing Sheets

(56) References Cited

U.S. PATENT DOCUMENTS

| | | |
|---|---|---|
| 6,493,755 B1 | 12/2002 | Hansen et al. |
| 6,535,512 B1 | 3/2003 | Daniel et al. |
| 6,658,568 B1 | 12/2003 | Ginter et al. |
| 6,664,978 B1 | 12/2003 | Kekic et al. |
| 6,701,345 B1 | 3/2004 | Carley et al. |
| 6,742,114 B1 | 5/2004 | Carter et al. |
| 6,751,661 B1 | 6/2004 | Geddes |
| 6,853,987 B1 | 2/2005 | Cook |
| 6,886,047 B2 | 4/2005 | Leong et al. |
| 6,895,414 B2 | 5/2005 | Ford et al. |
| 6,957,227 B2 | 10/2005 | Fogel et al. |
| 6,983,317 B1 | 1/2006 | Bishop et al. |
| 7,016,888 B2 | 3/2006 | Slemmer et al. |
| 7,035,877 B2 | 4/2006 | Markham et al. |
| 7,039,698 B2 | 5/2006 | Slemmer et al. |
| 7,051,050 B2 | 5/2006 | Chen et al. |
| 7,058,861 B1 | 6/2006 | Adams |
| 7,065,767 B2 | 6/2006 | Kambhammettu et al. |
| 7,080,037 B2 | 7/2006 | Burger et al. |
| 7,082,554 B2 | 7/2006 | Wilson et al. |
| 7,158,985 B1 | 1/2007 | Liskov |
| 7,159,036 B2 | 1/2007 | Hinchliffe et al. |
| 7,228,460 B2 | 6/2007 | Pomaranski et al. |
| 7,243,348 B2 | 7/2007 | Good et al. |
| 7,290,164 B1 | 10/2007 | Harvey et al. |
| 7,316,016 B2 | 1/2008 | DiFalco |
| 7,317,693 B1 * | 1/2008 | Roesch et al. ............... 370/252 |
| 7,360,099 B2 | 4/2008 | DiFalco et al. |
| 7,474,425 B2 | 1/2009 | Sasama |
| 7,529,197 B2 | 5/2009 | Shell et al. |
| 7,587,754 B2 | 9/2009 | DiFalco et al. |
| 7,590,669 B2 | 9/2009 | Yip et al. |
| 7,603,440 B1 | 10/2009 | Grabowski et al. |
| 7,620,715 B2 | 11/2009 | DiFalco et al. |
| 7,636,736 B1 * | 12/2009 | Kumar et al. .................... 1/1 |
| 7,765,460 B2 | 7/2010 | DiFalco et al. |
| 7,822,724 B2 | 10/2010 | DiFalco et al. |
| 8,090,677 B2 | 1/2012 | Murphy et al. |
| 8,140,635 B2 | 3/2012 | DiFalco |
| 8,176,158 B2 | 5/2012 | DiFalco et al. |
| 2001/0044840 A1 | 11/2001 | Carleton |
| 2001/0052010 A1 | 12/2001 | Kim |
| 2002/0026339 A1 | 2/2002 | Frankland et al. |
| 2002/0035561 A1 | 3/2002 | Archer et al. |
| 2002/0069274 A1 | 6/2002 | Tindal et al. |
| 2002/0116363 A1 | 8/2002 | Grainger |
| 2002/0176378 A1 | 11/2002 | Hamilton et al. |
| 2002/0188711 A1 | 12/2002 | Meyer et al. |
| 2003/0005109 A1 | 1/2003 | Kambhammettu et al. |
| 2003/0008662 A1 * | 1/2003 | Stern et al. .................... 455/456 |
| 2003/0101341 A1 | 5/2003 | Kettler et al. |
| 2003/0110280 A1 | 6/2003 | Hinchliffe et al. |
| 2003/0149756 A1 | 8/2003 | Grieve et al. |
| 2003/0172151 A1 | 9/2003 | Schade |
| 2003/0197743 A1 | 10/2003 | Hill et al. |
| 2003/0202201 A1 | 10/2003 | Muto et al. |
| 2003/0204517 A1 | 10/2003 | Skinner et al. |
| 2003/0217134 A1 | 11/2003 | Fontoura et al. |
| 2003/0233431 A1 | 12/2003 | Reddy et al. |
| 2004/0006614 A1 | 1/2004 | DiFalco |
| 2004/0024843 A1 | 2/2004 | Smith |
| 2004/0059770 A1 | 3/2004 | Bossen |
| 2004/0059930 A1 | 3/2004 | DiFalco et al. |
| 2004/0060046 A1 | 3/2004 | Good et al. |
| 2004/0068562 A1 | 4/2004 | Tilton et al. |
| 2004/0122962 A1 | 6/2004 | DiFalco et al. |
| 2004/0123133 A1 | 6/2004 | DiFalco et al. |
| 2004/0153875 A1 * | 8/2004 | Amyot et al. .................... 714/47 |
| 2004/0186903 A1 | 9/2004 | Lambertz |
| 2004/0205182 A1 | 10/2004 | Geddes |
| 2004/0243600 A1 | 12/2004 | Ikeda et al. |
| 2004/0252693 A1 | 12/2004 | Cheriton et al. |
| 2004/0254927 A1 | 12/2004 | Lang et al. |
| 2004/0260803 A1 | 12/2004 | Nakamura |
| 2005/0005169 A1 * | 1/2005 | Kelekar ......................... 713/201 |
| 2005/0015622 A1 | 1/2005 | Williams et al. |
| 2005/0043961 A1 | 2/2005 | Torres et al. |
| 2005/0096949 A1 | 5/2005 | Aiber et al. |
| 2005/0097199 A1 | 5/2005 | Woodard et al. |
| 2005/0120101 A1 | 6/2005 | Nocera |
| 2005/0149578 A1 | 7/2005 | Sustman et al. |
| 2005/0165954 A1 | 7/2005 | Burdick et al. |
| 2005/0177600 A1 | 8/2005 | Eilam et al. |
| 2005/0207553 A1 | 9/2005 | Fleck et al. |
| 2005/0256787 A1 | 11/2005 | Wadawadigi et al. |
| 2005/0278191 A1 | 12/2005 | DiFalco et al. |
| 2006/0025985 A1 * | 2/2006 | Vinberg et al. .................. 703/22 |
| 2006/0031529 A1 | 2/2006 | Keith, Jr. |
| 2006/0036560 A1 | 2/2006 | Fogel |
| 2006/0080656 A1 | 4/2006 | Cain et al. |
| 2006/0143685 A1 | 6/2006 | Vasishth et al. |
| 2006/0149704 A1 | 7/2006 | Wyatt et al. |
| 2006/0195905 A1 * | 8/2006 | Fudge ............................. 726/25 |
| 2006/0224663 A1 | 10/2006 | DiFalco |
| 2006/0242277 A1 | 10/2006 | Torrence et al. |
| 2007/0005740 A1 | 1/2007 | DiFalco et al. |
| 2007/0022365 A1 | 1/2007 | DiFalco et al. |
| 2007/0028303 A1 | 2/2007 | Brennan |
| 2007/0043674 A1 | 2/2007 | DiFalco et al. |
| 2007/0043786 A1 | 2/2007 | DiFalco et al. |
| 2007/0124255 A1 | 5/2007 | DiFalco et al. |
| 2008/0104217 A1 | 5/2008 | Srinivasa et al. |
| 2008/0126377 A1 * | 5/2008 | Bush et al. .................... 707/101 |
| 2008/0229262 A1 * | 9/2008 | Harashima et al. ............... 716/5 |
| 2009/0171732 A1 * | 7/2009 | Bobak et al. ..................... 705/8 |
| 2009/0183236 A1 * | 7/2009 | Ben-Ezra et al. ................. 726/4 |
| 2009/0204701 A1 * | 8/2009 | Herzog et al. ................. 709/224 |
| 2011/0137905 A1 | 6/2011 | Good et al. |
| 2011/0138038 A1 | 6/2011 | Good et al. |
| 2011/0138039 A1 | 6/2011 | Good et al. |
| 2011/0197094 A1 | 8/2011 | Wagner |
| 2011/0197189 A1 | 8/2011 | Wagner et al. |
| 2011/0197205 A1 | 8/2011 | Wagner et al. |
| 2012/0023076 A1 | 1/2012 | Torrence et al. |

OTHER PUBLICATIONS

Derbort et al., "Conversion of a Rule Based to an Object Oriented Expert System," IEEE, pp. 751-754 (1991).

Kerschberg et al., "Intelligent Network Management: A Heterogeneous Knowledge Source Approach," IEEE, pp. 314-316 (1990).

* cited by examiner

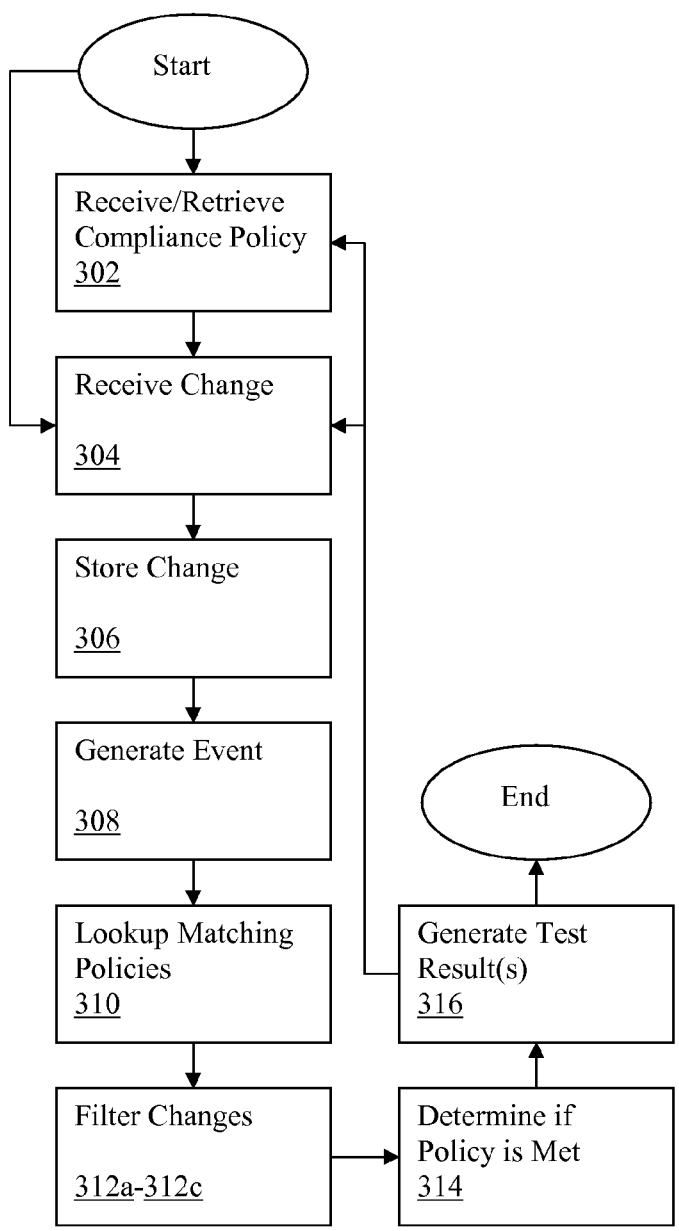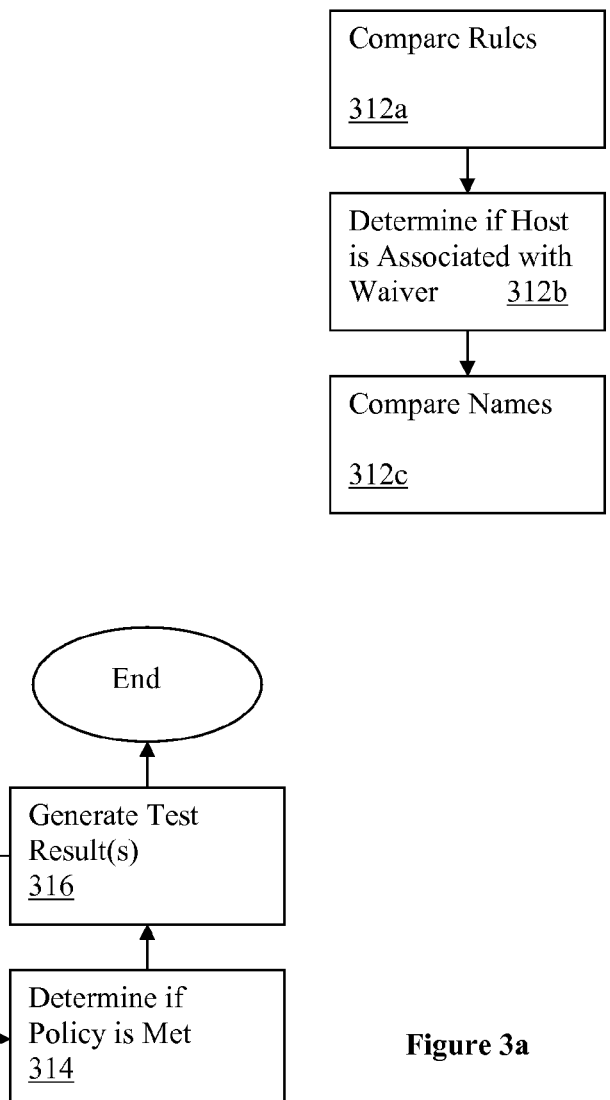
Figure 3b
Figure 3a

METHOD AND APPARATUS FOR CONTINUOUS COMPLIANCE ASSESSMENT

TECHNICAL FIELD

Embodiments relate to the field of compliance assessment, in particular to methods and apparatuses for performing continuous compliance assessment of target host data in response to changes on a target host.

BACKGROUND

Compliance with industry standards often requires occasional monitoring of rules, settings, and configuration parameters of computing devices. For example, one industry standard might mandate a minimum password length, and registry settings of a computing device may be monitored to determine whether minimum password lengths used by the compute device meet or exceed the industry standard. This monitoring is often initiated by a server that requests a number of client settings from a monitored computing device. Upon receiving the settings, the server may then analyze, classify, and/or store them, and issue a compliance report. If changes occur to the settings after they are reported to the server, those changes are not captured and evaluated until the next server request.

BRIEF DESCRIPTION OF THE DRAWINGS

Embodiments of the disclosure will be described by way of exemplary embodiments, but not limitations, illustrated in the accompanying drawings in which like references denote similar elements, and in which:

FIGS. 3A-3B illustrate a flow chart view of selected operations of the methods of various embodiments.

DETAILED DESCRIPTION OF ILLUSTRATIVE EMBODIMENTS

Illustrative embodiments include, but are not limited to, methods, systems, and articles for receiving, by a compliance server, change data associated with a change captured on a target host. In various embodiments, the target host may have provided the change data in response to detecting the change, and the change data may include one or more rules, settings, and/or parameters. Also, in various embodiments, the compliance server may determine whether the one or more rules, settings, and/or parameters meet one or more compliance policies and generate one or more test results based at least on the results of the determining. Further, in some embodiments, the target host may detect a change to a rule, setting, or parameter based on a collection policy defining what change data is to be collected by the target host and provide data associated with the rule, setting, or parameter as change data to the compliance server.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
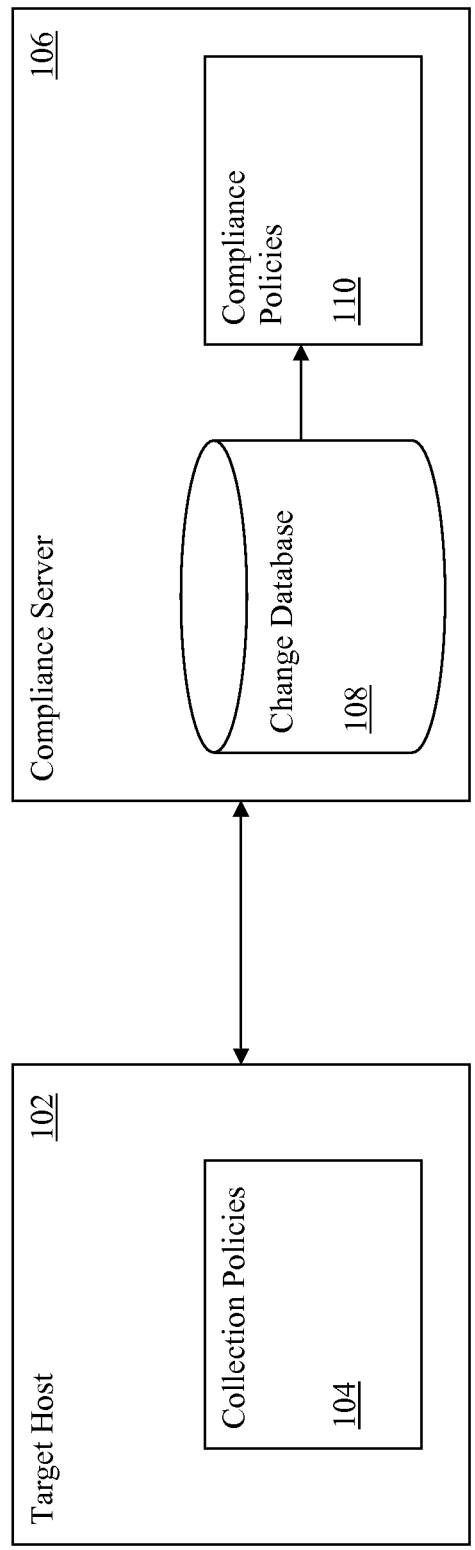
FIG. 1 illustrates a system-level view of various embodiments of the disclosure.

FIG. 1 illustrates a system-level view of various embodiments of the disclosure. As illustrated, a target host 102 may be communicatively coupled to a compliance server 106. The compliance server 106 may determine whether rules, settings, and/or configuration parameters of the target host 102 meet one or more compliance policies 110.

In various embodiments, target host 102 may include one or more rules or collection policies 104 for use in capturing changes to data of the target host 102, such as changes to rules, settings, and/or configuration parameters. Upon detecting/capturing a change, the target host 102 may provide data associated with the change to the compliance server 106 to store in a change database 108 of the compliance server 106. Logic of the compliance server 106 may then generate an event to notify one or more event listeners of the compliance server 106 that data associated with a new change has been stored in the change database 108. The compliance server 106 may then look up all compliance policies 110 that match collection policies or rules 104 specified in the received change data. In some embodiments, the compliance server 106 may then filter the change data and determine whether one or more rules, settings, and/or parameters of the change data meet one or more compliance policies 110. The determining may include evaluating an expression of at least one of the compliance policies 110 against element data specified in the change data. In various embodiments, the compliance server 106 may then generate test results based on whether the compliance policies 110 were met. In one embodiment, the compliance server 106 may further generate a report. The report may then be provided to target host 102, and/or an administrative user of compliance server 106, or to some other system.

Figure 4:
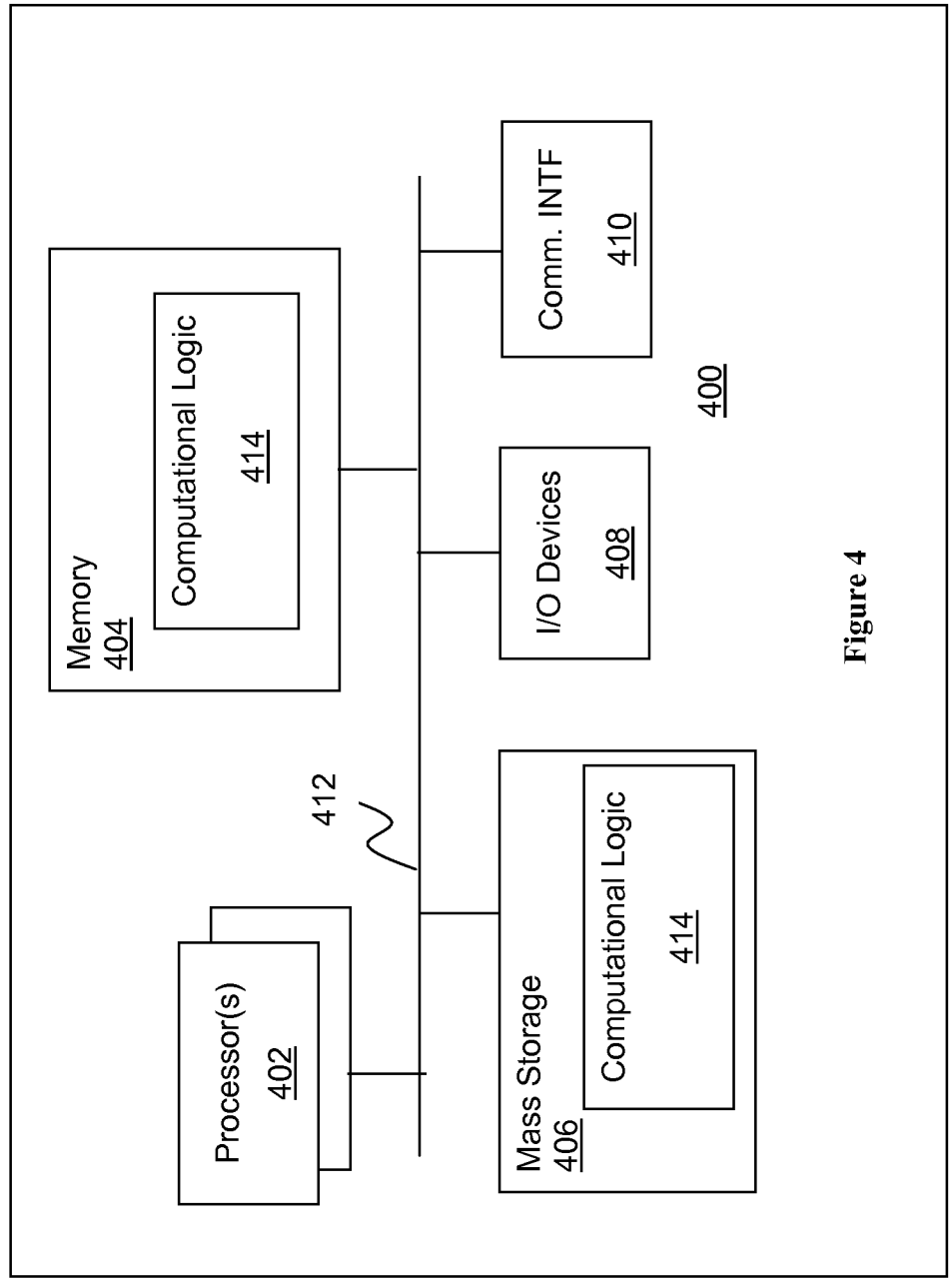
FIG. 4 illustrates an example computer system suitable for use to practice aspects of various embodiments.

In various embodiments, target host 102 and compliance server 106 may be any sort of computing devices known in the art, except for collection policies 104, change database 108, compliance policies 110, and logic configured to perform the operations discussed herein. The computing devices may be personal computers (PC), workstations, servers, routers, mainframes, modular computers within blade servers or high-density servers, personal digital assistants (PDA), entertainment centers, set-top boxes, or mobile devices. An exemplary computing device is illustrated by FIG. 4, and will be described in greater detail herein. In some embodiments, compliance server 106 and target host 102 may be deployed on computing devices of the same organization. In other embodiments, compliance server 106 may belong to a separate organization, such as a compliance monitoring organization whose purpose is to monitor and ensure industry standards. Also, in one embodiment, target host 102 and compliance server 106 may be separate logical components or virtual machines of the same computing device.

In various embodiments, as mentioned above, target host 102 may have one or more collection policies or rules 104, and compliance server 106 may have a change database 108 and one or more compliance policies 110. These components and associated data and logic are also illustrated in FIG. 2 and will be described herein in greater detail herein.

In various embodiments, where target host 102 and compliance server 106 are remotely disposed from each other, they may be communicatively coupled to each other. In some embodiments, the computing devices may be coupled by a networking fabric (not illustrated). Such a networking fabric may include one or more of a local area network (LAN), a wide area network (WAN), and the Internet, as is known in the art. In one embodiment, the networking fabric may comprise a private network or a virtual private network (VPN) that may utilize tunneling. In some embodiments, where target host 102 and compliance server 106 belong to the same organization, they may be coupled by one or more private LANs or WANs of the organization.

Figure 2:
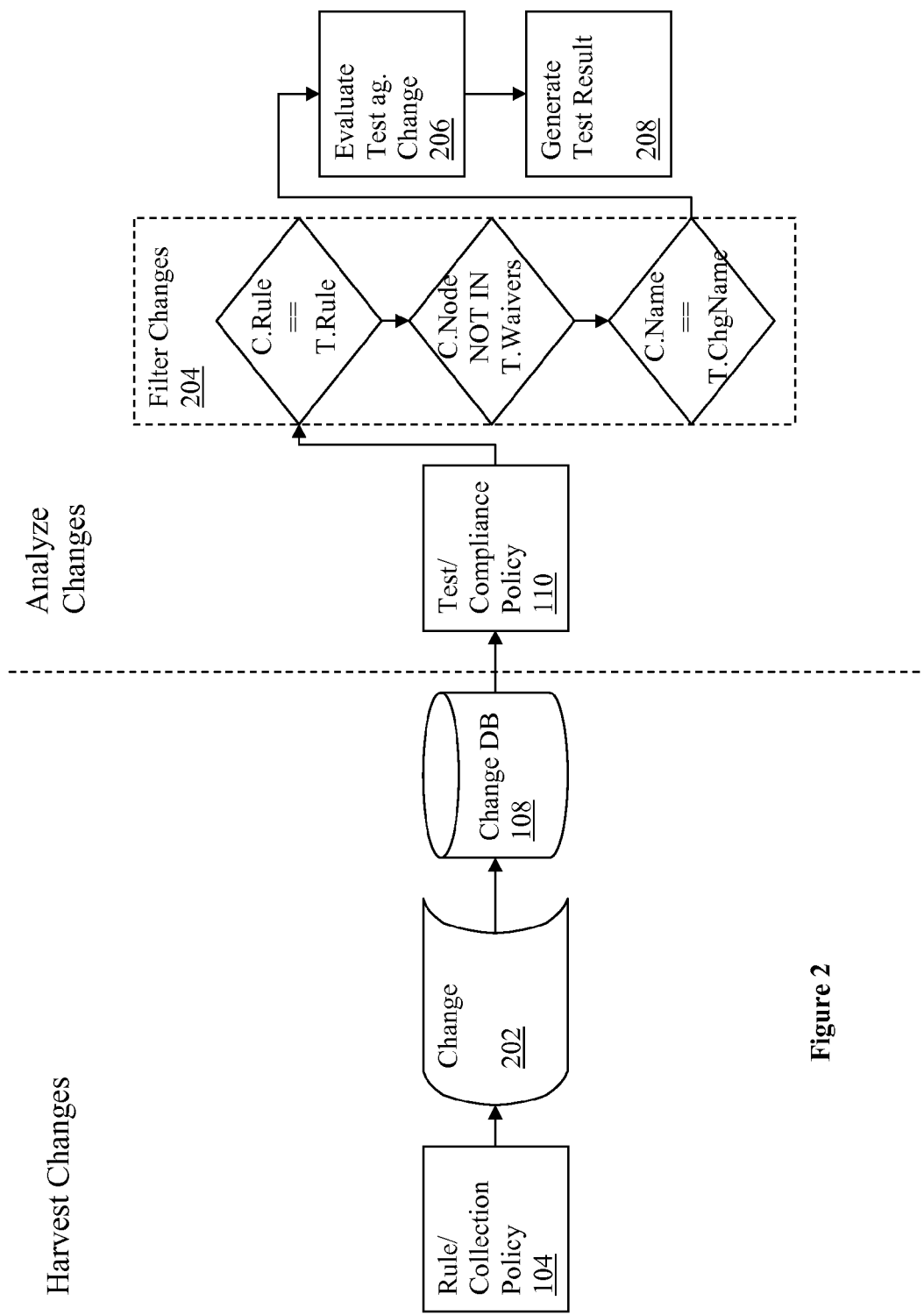
FIG. 2 illustrates an operational overview of a change collection and analysis, in accordance with various embodiments.

FIG. 2 illustrates an operational overview of a change collection and analysis, in accordance with various embodiments. In various embodiments, collecting change data 202 may be accomplished by logic of the target host applying collection policies of rules to changes that are captured/detected on the target host. In some embodiments, collection policies/rules 104 may define a period at which a snapshot of the target system is be taken. In such embodiments, the period may be constant (such as every minute) or variable (such as increased or decreased frequency based on target host 102 usage). Also, the snapshot taken may be of all rules, settings, and configuration parameters on target host 102, or may be limited to a subset, such as all registry settings. In other embodiments, collection policies or rules 104 may instead define rules, settings, or configuration parameters of the target host 102 to monitor. Monitoring of these rules, settings, or configuration parameters may be accomplished through any monitoring/listening mechanism known in the art. Collection policies or rules 104 may monitor all rules, settings, or configuration parameters, or only a subset. In various embodiments, collection policies or rules 104 may be specified in any manner, such as system addresses, command lines, or other text that is interpretable by target host 102. Further, collection policies or rules 104 may be stored in any sort of file, database, or structure of target host 102. In one embodiment, collection policies or rules may be stored remotely, such as on compliance server 106, and periodically fetched by target host 102.

In various embodiments, the captured/detected change may be associated with other descriptive data to form change data 202. For example, the change data 202 for a given change may include an identification of the node or target host 102 on which the change was captured, the rule or collection policy 104 responsible for the capturing of the change, a name of the data element (such as a rule, setting, or configuration parameter) for which the change was detected, and the element data of the element for which the change was detected. In one exemplary embodiment, if the change was detected for a minimum password length setting, the change data 202 may include the name of the setting (e.g., "minPwdLength") and the minimum password length (e.g., 10 characters).

In some embodiments, the collection policies 104 and the logic for applying them may be used to monitor a remote host. In such embodiments, the collection policies 104 and logic may be located on compliance server 106, or another device, and may be used to remotely detect changes on a target host 102.

In various embodiments, upon being generated, change data 202 may be stored in change database 108. As mentioned above, in some embodiments change database 108 may be a database of the compliance server 106. In other embodiments, change database 108 may reside on a different computing device then compliance server 106. For example, change database 108 may reside on a database server device that is communicatively coupled to compliance server 106. Further, in various embodiments, change database 108 may be any sort of database known in the art, such as a relational database, a normalized or de-normalized database, a data structure, or an unformatted file. In some embodiments, change database 108 may store all change data 202 received from target hosts. In other embodiments, change database 108 may have a data retention policy and may discard change data 202 after a specified/pre-determined duration of time.

As mentioned previously, upon new change data 202 being stored in change database 108, an event may be generated to notify logic of compliance server 106 of the arrival of the change data 202. Such logic may include one or more event listeners configured to detect events as they are generated. Upon detecting an event, the logic of compliance server 106 may look up tests/compliance policies 110 (hereinafter "compliance policies 110") that match collection policies or rules 104 specified in the received change data 202. For example, if a collection policy 104 specified monitoring of a minimum password length, a compliance policy 110 specifying a minimum password length standard may be determined to be a match. Also, in some embodiments, compliance policies 110 may include elements specifying collection policies 104 to which they may apply. In such embodiments, determining matches may simply comprise comparing compliance policy 110 elements to collection policies 104 of change data 202 to determine if the elements specify the collection policies 104.

In various embodiments, compliance policies 110 may each comprise a number of elements. For example, a compliance policy 110 may specify a rule or collection policy 104, a change name (such as a name of the target host 102 data element for which a change was detected), one or more waivers from the compliance policy 110, and an expression for evaluating element data of the change data 202. In some embodiments, the collection policy 104 may correspond to a collection policy 104 specified in change data 202 and the change name may correspond to the element name specified in change data 202. Also, the waivers may specify whether a target host 102 identified by change data 202 is exempted from the compliance policy 110. In some embodiments, the expression may include one or more conditions that are to be applied to data elements of change data 202 to determine whether the data elements are in compliance with the policy 110. In various embodiments, compliance policies 110 may be specified in any manner, such as, for example, tables, collections of tables, lists, or other data structures. Further, compliance policies 110 may be stored in any sort of file, database, or structure of compliance server 106. In one embodiment, compliance policies 110 may be stored remotely and fetched by compliance server 106.

In some embodiments, compliance server 106 may receive or retrieve new or updated compliance policies 110, periodically or as they become available. In one embodiment, such new or updated policies may be retrieved or received from a service or a compliance standards organization that defines industry standards.

In various embodiments, logic of compliance server 106 may filter 204 change data 202 after looking up matching compliance policies 106. As illustrated in FIG. 2, filtering 204 change data 202 may include performing a number of narrowing determinations to ensure that the policies 110 are only applied to the target hosts 102 and changes to which they are intended to apply. For example, a first of these filtering operations 204 has already been mentioned: comparing a rule/collection policy 104 specified in an element of the compliance policy 110 to a rule/collection policy 104 specified in the change data. If there is a match, further filtering operations 204 may be performed. For instance, compliance server 106 may check whether the target host/node 102 is listed in a waivers list element of a compliance policy 106. Then, if the target host 102 specified in the change data is not present in the waivers list, the compliance server 106 may determine whether a change name specified in the compliance policy 110 matches an element name specified in the change data 202, such as the element name described previously. If there is a match, the compliance server 106 may then apply the compliance policy 110 to the change data.

In some embodiments, the compliance server 106 may apply a compliance policy 110 to change data 202 to determine whether the one or more rules, settings, and/or configuration parameters specified in the change data meet one or more compliance policies 110. As previously mentioned, the rules, settings, and/or configuration parameters may be specified by the element name and element data of change data 202. And as illustrated, that determining may comprise evaluating 206 an expression specified in a compliance policy 110 against element data specified in the change data 202. For example, the expression of the compliance policy may specify that all passwords must be at least 10 characters long, and the element data of change data 202 may specify that a recently changed password setting requires passwords to be at least 9 characters long. Such an evaluation may then indicate that the password setting of the target host 102 is not in compliance with compliance policy 110.

In various embodiments, the compliance server may then generate 208 a test result based on the determining/evaluating. The test result may indicate either that the rule, setting, or configuration parameter specified in change data 202 is in compliance or not in compliance with compliance policy 110. In various embodiments, the test results may then be stored in a test results database (not illustrated). In one embodiment, the test results database may be identical to the change database. In some embodiments, the compliance server 106 may then generate a report based on the test result and may store the report or provide it to the target host 102, an administrative user through a user interface of compliance server 106, and/or some other system. The report may include an indication of whether or not a given rule, setting, or parameter is in compliance and, if not in compliance, an indication of what an appropriate value or values for a compliant rule, setting, or parameter would be. In one embodiment, the compliance server 106 may provide the report to an industry standards/compliance monitoring organization.

In some embodiments, upon receiving a report indicating that a rule, setting, or parameter is not in compliance, target host 102 may take a remedial measure to place the rule, setting, or change in compliance.

FIGS. 3A-3B illustrate a flow chart view of selected operations of the methods of various embodiments. As illustrated, a compliance server may receive change data associated with a change captured on a target host, block 304, the target host providing the change data in response to detecting the change, and the change data including one or more rules, settings, and/or parameters. In some embodiments, the change data may include a rule that generated the change, the target host or node that the change data was collected from, a specific element name associated with the change, and element data associated with the change.

As is further illustrated, the compliance server may store the received change data in a change database, block 306. Also, in response to receiving the change data, the compliance server may generate an event to indicate receipt of the change data, block 308. The compliance server may then lookup all compliance policies that match collection policies or rules specified in the received change data, block 310. In various embodiments, each compliance policy may include a rule or collection policy, a change name, one or more waivers from the compliance policy, and an expression for evaluating element data of the change. Also, in some embodiments, the compliance server may receive or retrieve new or updated compliance policies, block 302, from another server, system, or storage.

In various embodiments, the compliance server may then filter the change data, blocks 312a-312c. As illustrated in FIG. 3B, the filtering may include comparing a first rule specified in the change data with a second rule specified in the one or more compliance policies, block 312a, determining whether a target host or node specified in the change data is associated with one or more waivers specified by the one or more compliance policies, block 312b, and/or comparing an element name specified in the change data with a name specified in the one or more compliance policies, block 312c.

As illustrated in FIG. 3A, the compliance server may then determine whether the one or more rules, settings, and/or parameters meet one or more compliance policies, block 314. In some embodiments, the determining may be conditionally performed based on a result of the filtering. Also, the determining may be performed in response to the generating of the event, block 308. In various embodiments, the determining may include evaluating an expression of at least one of the compliance policies against element data specified in the change data.

In some embodiments, the compliance server may then generate one or more test results based at least on the results of the determining, block 316. In such embodiments, the generating may comprise generating a report to the target host and/or an administrative user.

Also, in various embodiments, the compliance server may repeat the receiving, determining, and generating in real time each time the target host captures an additional change.

FIG. 4 illustrates an exemplary computer system suitable for use to practice aspects of various embodiments. As may be seen, computing system 400 includes a number of processors or processor cores 402, and system memory 404. For the purpose of this application, including the claims, the terms "processor" and "processor cores" may be considered synonymous, unless the context clearly requires otherwise. Additionally, computing system 400 includes mass storage devices 406 (such as diskette, hard drive, compact disc read only memory (CDROM), a disc storage device, and so forth), input/output devices 408 (such as display, keyboard, cursor control and so forth) and communication interfaces 410 (such as network interface cards, modems and so forth). The elements are coupled to each other via system bus 412, which represents one or more buses. In the case of multiple buses, they are bridged by one or more bus bridges (not illustrated).

Each of these elements performs its conventional functions known in the art. In particular, system memory 404 and mass storage 406 may be employed to store a working copy and a permanent copy of the programming instructions implementing one or more aspects of the above described teachings to practice the various embodiments, herein collectively denoted as 422. The various components may be implemented by assembler instructions supported by processor(s) 402 or high-level languages, such as, for example, C, that may be compiled into such instructions.

The permanent copy of the programming instructions may be placed into permanent storage 406 in the factory, or in the field, through, for example, a distribution medium (not illustrated), such as a compact disc (CD), or through communication interface 410 (from a distribution server (not illustrated)). That is, one or more distribution media having an implementation of the agent program may be employed to distribute the agent and program various computing devices.

The constitution of these elements 402-412 are generally known to one skilled in the art, and accordingly will not be further described.

In embodiments of the present invention, an article of manufacture (not illustrated) may be employed to implement one or more methods as disclosed herein. For example, in exemplary embodiments, an article of manufacture may comprise a storage medium and a plurality of programming instructions stored on the storage medium and configured to program a target host to detect a change to a rule, setting, or parameter based on a collection policy defining what change data is to be collected by the target host, and provide data associated with the rule, setting, or parameter as change data to a compliance server. The compliance server may determine whether the rule, setting, or parameter meet one or more compliance policies. In other exemplary embodiments, the plurality of programming instructions may be configured to program a compliance server to receive data associated with a change captured on a target host, the target host providing the data in response to detecting the change, and the data including one or more rules, settings, and/or parameters. The instructions may further be configured to determine whether the one or more rules, settings, and/or parameters meet one or more compliance policies, and to generate one or more test results based at least on the results of the determining.

Although specific embodiments have been illustrated and described herein, it will be appreciated by those of ordinary skill in the art that a wide variety of alternate and/or equivalent implementations may be substituted for the specific embodiments illustrated and described, without departing from the scope of the embodiments. This application is intended to cover any adaptations or variations of the embodiments discussed herein. Therefore, it is manifestly intended that the embodiments be limited only by the claims and the equivalents thereof.

What is claimed is:

1. A method for continuous compliance assessment comprising:
    receiving, by a compliance server, change data associated with a change to a target host rule detected by a collection policy that defines a scope of what change data is to be collected, and for which rules of the target host, the change data comprising:
    (a) an identification of the target host,
    (b) an identification of the collection policy, and
    (c) element data for the change to the target host rule;
    determining, by the compliance server, whether the change to the target host rule meets one or more of a plurality of compliance policies associated with the collection policy, the determining comprising:
        matching the collection policy with the one or more of the plurality of compliance policies,
        evaluating whether the target host specified in the change data is associated with one or more waivers and thereby determining that the target host is not associated with the one or more waivers, and
        evaluating the element data against expressions of the matching one or more compliance policies, the expressions specifying requirements of the matching one or more compliance policies; and
    generating, by the compliance server, one or more test results based at least on results of the determining, the one or more test results indicating whether the change to the target host rule is in compliance with the matching one or more compliance policies, and
    when the change is not in compliance with the matching one or more compliance policies, generating appropriate element data for the target host rule to place the target host rule into compliance with the matching one or more compliance policies.

2. The method of claim 1, further comprising storing, by the compliance server, the received change data in a change database.

3. The method of claim 1, further comprising:
    in response to receiving the change data, generating, by the compliance server, an event; and
    performing the determining in response to the generated event.

4. The method of claim 1, further comprising filtering, by the compliance server, the received change data and conditionally performing the determining based on a result of the filtering.

5. The method of claim 1, wherein the generating the one or more test results comprises generating a report for at least one of the target host or an administrative user.

6. The method of claim 1, further comprising receiving or retrieving, by the compliance server, new or updated compliance policies.

7. The method of claim 1, further comprising repeating the receiving, determining, and generating in real time each time the target host captures an additional change to the target host rule.

8. The method of claim 1, wherein one or more standards are defined by standards organizations that define industry standards, the matching one or more compliance policies ensuring that the target host is in compliance with the one or more standards.

9. The method of claim 8, wherein the matching one or more compliance policies comprising matching at least two compliance policies, and wherein each of the at least two compliance policies is for a different standard.

10. The method of claim 1, further comprising performing remedial measures to place the target host in compliance with the matching one or more compliance policies based on the one or more test results.

11. A compliance server for continuous compliance assessment comprising:
    a computer processor;
    a change database for storing change data associated with a change to a target host rule detected by a collection policy that defines a scope of what change data is to be collected, and for which rules of the target host, wherein the change data comprises:
    (a) an identification of the target host,
    (b) an identification of the collection policy, and (c) element data for the target host configuration parameter or setting, the element data specifying requirements of the target host rule; and logic communicatively coupled to the change database and operable by the computer processor to:
receive the change data;
store the change data in the change database;
determine which one or more of a plurality of compliance policies match the collection policy;
evaluate whether the change to the target host rule complies with the matching one or more compliance policies, the evaluating comprising:
identifying whether the target host is associated with one or more waivers specified by the matching compliance policies; and
when the target host is not exempt from the matching one or more compliance policies, evaluating the element data for compliance with the matching one or more compliance policies;
generate one or more test results based at least on results of the determining and evaluating, the one or more test results indicating whether the change to the target host rule is in compliance with the matching one or more compliance policies; and
when the change is not in compliance with the matching one or more compliance policies, generating appropriate element data for the target host rule to place the target host rule into compliance with the matching one or more compliance policies.

12. The compliance server of claim 11, wherein the logic is further operable by the processor to filter the received change data and conditionally perform the determining based on a result of the filtering.

13. The compliance server of claim 11, wherein the identifying whether the target host is associated with the one or more waivers specified by the matching compliance policies comprises determining whether the target host is listed in a waiver list element of the matching one or more compliance policies.

14. A non-transitory storage medium storing programming instructions configured to cause a target host to:
detect a change to a target host rule detected by a collection policy that defines a scope of what change data is to be collected, and for which rules of the target host;
provide change data to a compliance server, the change data comprising:
(a) an identification of the target host,
(b) an identification of the collection policy, and
(c) element data for the change to the target host rule; and
receive a report from the compliance server including one or more test results, the one or more test results being based at least on results of:
matching, by the compliance server, the collection policy with one or more of a plurality of compliance policies,
evaluating whether the target host specified in the change data is associated with one or more waivers and thereby determining that the target host is not associated with the one or more waivers, and
evaluating the element data against expressions specifying requirements of the matching one or more compliance policies,
the one or more test results indicating whether the change to the target host rule is in compliance with the matching one or more compliance policies, and when the change is not in compliance with the matching one or more compliance policies, generating appropriate element data for the target host rule to place the target host rule into compliance with the matching one or more compliance policies.

15. The non-transitory storage medium of claim 14, wherein the programming instructions are further configured to cause the target host to repeat the detecting and providing each time a change to the target host rule occurs on the target host.

16. A non-transitory storage medium storing programming instructions configured to cause a compliance server to perform a method, the method comprising:
receiving change data associated with a change to a target host rule detected by a collection policy that defines a scope of what change data is to be collected and for which rules of the target host, the change data comprising:
(a) an identification of the target host,
(b) an identification of the collection policy, and
(c) element data for the change to the target host rule;
determining whether the change to the target host rule meets one or more of a plurality of compliance policies associated with the collection policy, the determining comprising:
matching the collection policy with the one or more of the plurality of compliance policies,
evaluating whether the target host specified in the change data is associated with one or more waivers and thereby determining that the target host is not associated with the one or more waivers, and
evaluating the element data against expressions of the matching one or more compliance policies, the expressions specifying requirements of the matching one or more compliance policies;
generating one or more test results based at least on results of the determining, the one or more test results indicating whether the change to the target host rule is in compliance with the matching one or more compliance policies; and
when the change is not in compliance with the matching one or more compliance policies, generating appropriate element data for the target host rule to place the target host rule into compliance with the matching one or more compliance policies.

\* \* \* \* \*